(12) United States Patent
Xu et al.

(10) Patent No.: US 7,898,551 B2
(45) Date of Patent: Mar. 1, 2011

(54) SYSTEMS AND METHODS FOR PERFORMING A BANK SWIZZLE OPERATION TO REDUCE BANK COLLISIONS

(75) Inventors: Jim Xu, San Jose, CA (US); Wen Chen, Cupertino, CA (US); Li Liang, Shanghai (CN)

(73) Assignee: Via Technologies, Inc., Taipei (TW)

( * ) Notice: Subject to any disclaimer, the term of this patent is extended or adjusted under 35 U.S.C. 154(b) by 918 days.

(21) Appl. No.: 11/765,129

(22) Filed: Jun. 19, 2007

(65) Prior Publication Data
US 2008/0079744 A1 Apr. 3, 2008

Related U.S. Application Data

(60) Provisional application No. 60/815,053, filed on Jun. 20, 2006.

(51) Int. Cl.
*G09G 5/36* (2006.01)
*G06F 12/02* (2006.01)
*G06T 11/40* (2006.01)

(52) U.S. Cl. .................. 345/557; 345/544; 345/552
(58) Field of Classification Search ............. 345/537, 345/540, 552, 557, 582
See application file for complete search history.

(56) References Cited

U.S. PATENT DOCUMENTS

| 5,765,182 | A  | * | 6/1998  | Lau et al. ................... 711/5 |
|-----------|----|---|---------|--------------------------------------|
| 6,029,225 | A  | * | 2/2000  | McGehearty et al. ......... 711/5 |
| 6,204,863 | B1 |   | 3/2001  | Wilde |
| 6,246,422 | B1 | * | 6/2001  | Emberling et al. .......... 345/552 |
| 6,266,733 | B1 | * | 7/2001  | Knittel et al. ............... 711/5 |
| 6,288,730 | B1 | * | 9/2001  | Duluk et al. ............... 345/552 |
| 6,353,438 | B1 | * | 3/2002  | Van Hook et al. .......... 345/552 |
| 6,393,512 | B1 | * | 5/2002  | Chen et al. .................. 711/5 |
| 6,724,396 | B1 | * | 4/2004  | Emmot et al. .............. 345/587 |
| 6,825,848 | B1 | * | 11/2004 | Fu et al. ...................... 345/557 |
| 7,027,063 | B1 | * | 4/2006  | Minkin ........................ 345/552 |
| 7,050,063 | B1 | * | 5/2006  | Mantor et al. .............. 345/582 |
| 2003/0163643 | A1 | * | 8/2003 | Riedlinger et al. .......... 711/131 |
| 2004/0093457 | A1 | * | 5/2004 | Heap ............................ 711/5 |

* cited by examiner

*Primary Examiner*—Kee M Tung
*Assistant Examiner*—Jacinta Crawford
(74) *Attorney, Agent, or Firm*—Thomas, Kayden, Horstemeyer & Risley, LLP

(57) ABSTRACT

Systems and methods for graphics data management are described. One embodiment includes a method for reducing bank collisions within a level 2 (L2) cache comprising the following: reading texture data from external memory configured to store texture data used for texture filtering within the graphics processing unit, partitioning the texture data into banks, performing a bank swizzle operation on the banks, and writing the banks of data to the L2 cache.

18 Claims, 10 Drawing Sheets

SYSTEMS AND METHODS FOR PERFORMING A BANK SWIZZLE OPERATION TO REDUCE BANK COLLISIONS

CROSS-REFERENCE TO RELATED APPLICATION

This application claims priority to, and the benefit of, U.S. Provisional Patent Application entitled, "Texture Cache and Filter Target Specification," having Ser. No. 60/815,053, filed on Jun. 20, 2006, which is incorporated herein by reference in its entirety.

TECHNICAL FIELD

The present disclosure generally relates to graphics processing and more specifically relates to systems and methods for graphics data management.

BACKGROUND

As is known, computer graphics processing systems process large amounts of data, including texture data, among others. A texture is a digital image, often rectangular, having a (u, v) coordinate space. The smallest addressable unit of a texture is a texel, which is assigned a specific (u, v) coordinate based on its location. In a texture mapping operation, a texture is mapped to the surface of a graphical model as the model is rendered to create a destination image. In the destination image, pixels are located at specific coordinates in the (x, y) coordinate system. The purpose of texture mapping is to provide a realistic appearance on the surface of objects.

Texture data often resides in system memory, which is a shared resource. In many computer systems, other devices may attempt to access data used by the graphics processing system or utilize a shared system bus, both of which may result in increased data access time for the graphics processing system. Additionally, requests for data from system memory may take excessive amounts of time for other reasons. Accordingly, accessing system memory may have a performance inhibiting effect on graphics processing systems.

In modern computer graphics, texture processing can include many different types of texture mapping techniques including cubic mapping, mipmapping, and anisotropic mapping among others. The complexity and volume of arithmetic and logical operations utilized to perform texture processing necessitate the use of dedicated circuits in addition to those utilized in other graphics processing operations. Accordingly, these dedicated texture processing circuits can include a significant percentage of the hardware gates that make up a graphics processing unit.

Texture mapping is expensive both in computation and memory accesses. One technique for improving data accessibility is through a texture cache that is dedicated to storing texture data. The texture cache is provided texture data from the system memory before the data is required for texture processing, thereby providing the graphics system with the texture data and reducing the requirement to access system memory. This in turn reduces problems associated with memory latency. However, memory latency continues to be an issue even with the use of texture caches due to bank collisions, or cache thrashing, that may occasionally occur. Therefore, a previously unaddressed need exists in the industry for improved and optimized storage in cache memory of texture tile data.

SUMMARY

Embodiments of the present disclosure provide systems and methods for storage of graphics data. One embodiment includes a method for reducing bank collisions within a level 2 (L2) cache comprising reading texture data from external memory configured to store texture data used for texture filtering within the graphics processing unit, partitioning the texture data into banks, performing a bank swizzle operation on the banks, and writing the banks of data to the L2 cache.

Another embodiment includes a computer system for processing graphics data comprising an external memory configured to store texture data used for texture filtering within the graphics processing unit, a bank swizzle module configured to receive texture data from the external memory, partition the texture data into banks, and perform a bank swizzle operation on the banks of texture data, and a level 2 (L2) cache coupled to the bank swizzle module, wherein the L2 cache is configured to store the remapped texture data.

Yet another embodiment includes a method for reducing bank collisions within a L2 cache comprising fetching texture data from the L2 cache, wherein the texture data is used for texture filtering within a graphics processing unit, determining whether a bank collision has occurred while fetching the texture data, wherein the texture data is divided into banks located in at least one cache line within the L2 cache, and performing a bank swizzle operation on the banks if a bank collision has occurred.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of a systems and methods for storing texture data in a slice-major format and the underlying methods can be better understood with reference to the following drawings. The components in the drawings are not necessarily to scale, emphasis instead being placed upon clearly illustrating the principles of the disclosed systems and methods. Moreover, in the drawings, like reference numerals designate corresponding parts throughout the several views.

DETAILED DESCRIPTION

Figure 1:
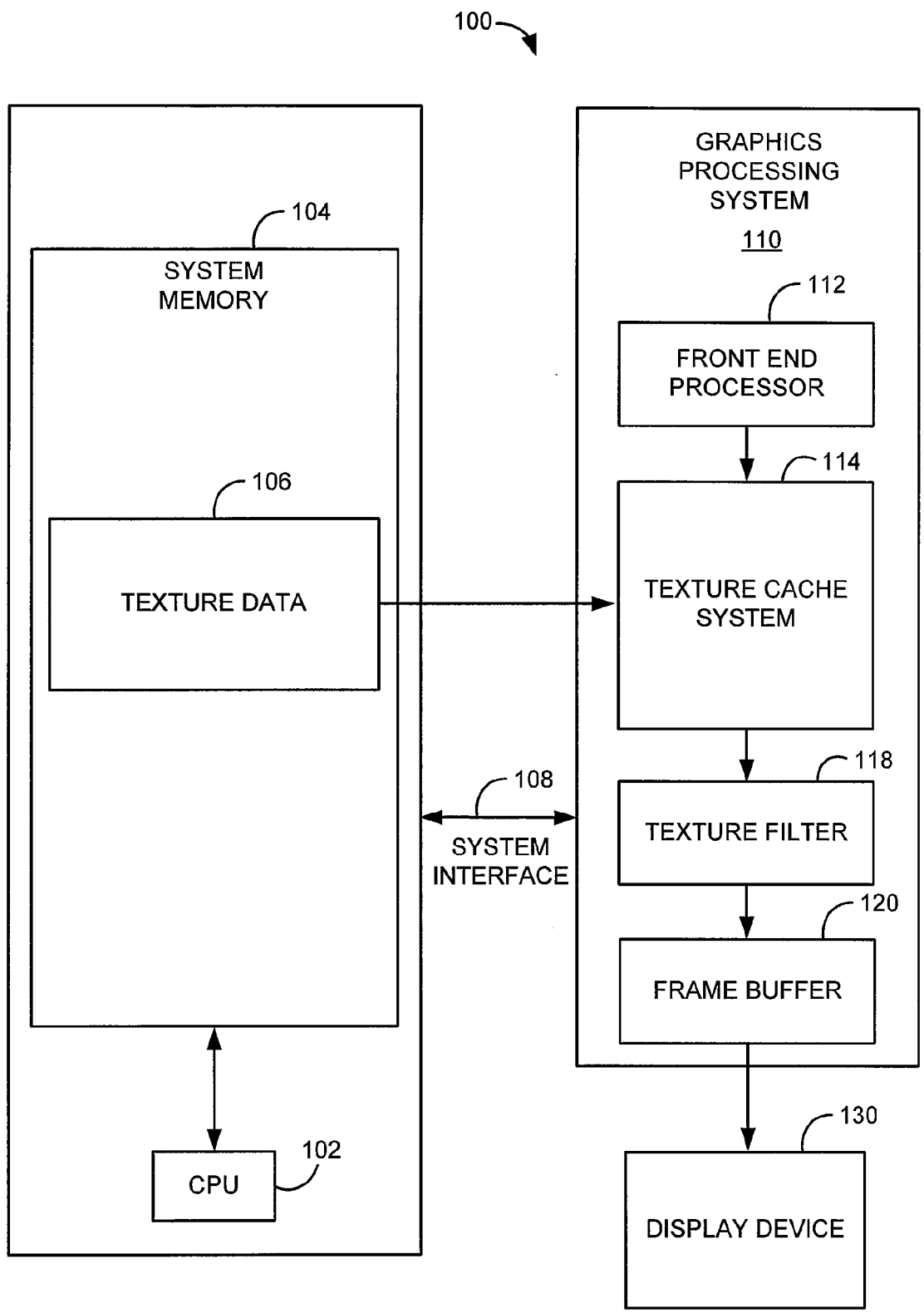
FIG. 1 is a block diagram of an embodiment of a multiple graphics processor system.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Systems and methods are disclosed for efficiently managing and organizing texture data such that any texture data required for processing by, for example, a texture filter, is readily retrievable in a graphics processing system. Generally, texture data is received from system memory in a multitude of different formats and sizes. Failure to take into consideration the size or organization of this data may result in inefficient use of texture cache resources. One source of inefficiency occurs when there is too much latency in retrieving texture data. Understandably, this latency from retrieving texture data results in delays in processing this data. In some cases, this latency may be caused by bank collisions that occur within the cache memory. Bank collisions occur when an attempt is made to retrieve data from banks that have the same index and which are stored in different cache lines. Given the localized nature of texture data, banks that are stored close together will more likely be fetched together during a memory access.

Within the context of graphics processing, texture data is not necessarily retrieved one cache line at a time, but rather on a bank-by-bank basis. Thus, any combination of banks may be retrieved from any given cache line during a memory access. For example, during a memory access, (line 1, bank 0), (line 2, bank 1), etc. may be fetched together. However, if an attempt is made to retrieve (line 1, bank 0) and (line 2, bank 0), a bank collision occurs and the two banks with the same indices must be retrieved separately, resulting in a delay of at least one cycle. Thus, as a result of bank collisions, additional cycles are needed to retrieve the bank. Embodiments of systems and methods for performing bank swizzle operations reduce the probability for bank collisions by increasing the distance between banks that have the same index number and that are located in adjacent cache lines.

Figure 6:
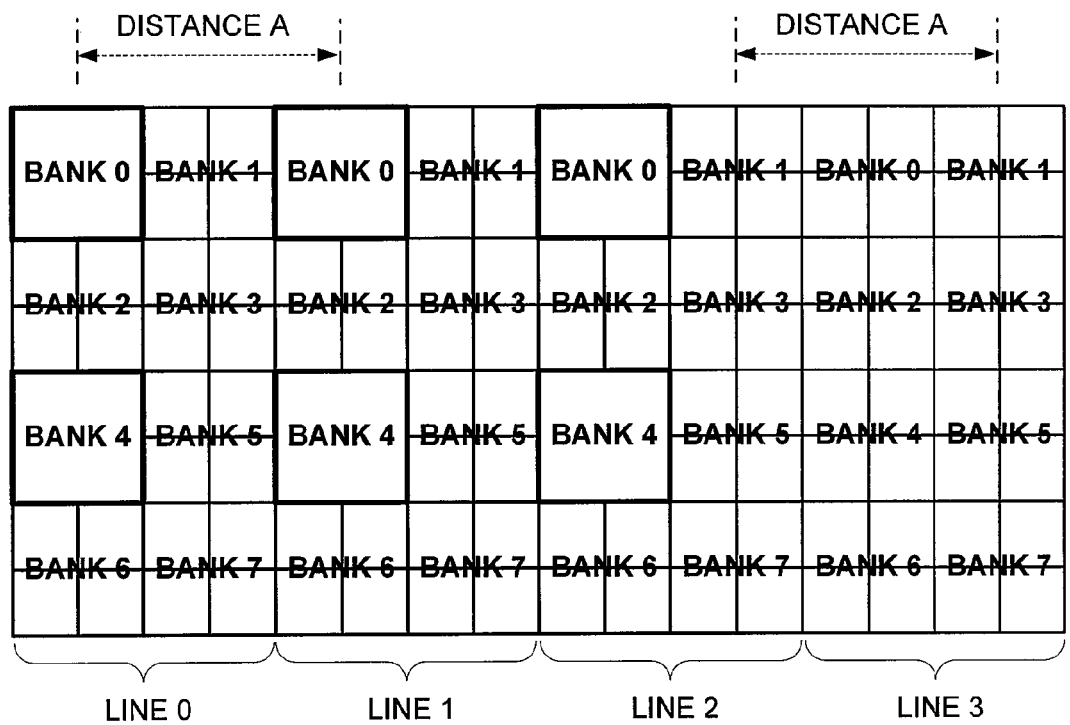
FIG. 6 illustrates a 4×8 footprint for texture data with a resolution of 32 BPE.
Figure 7:
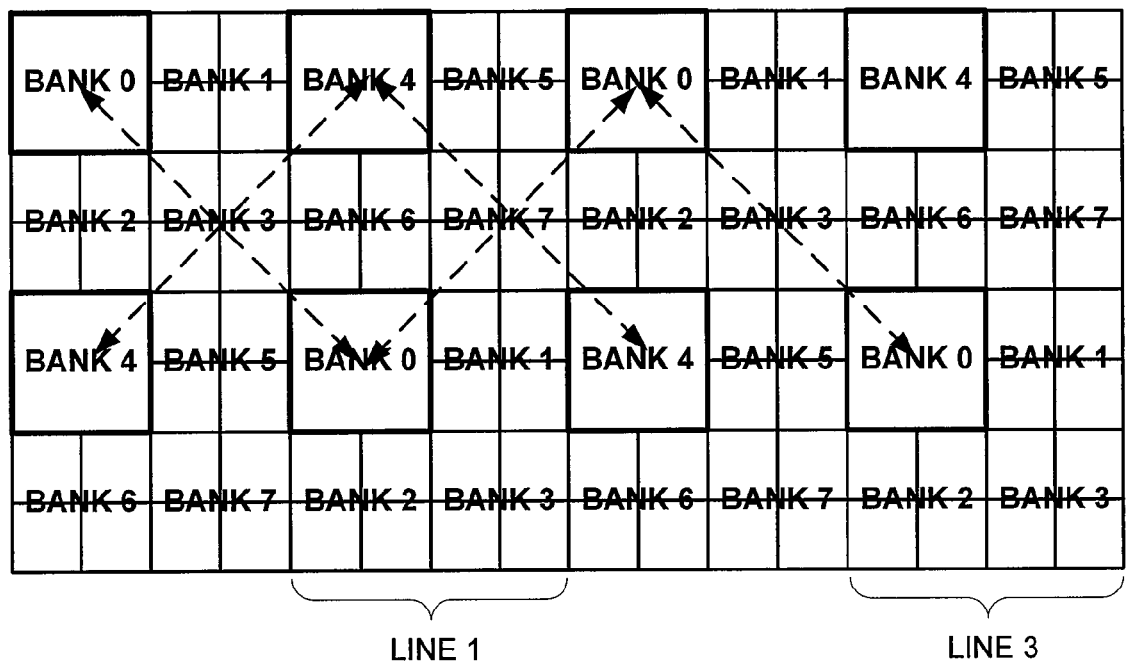
FIG. 7 illustrates the increase in distance between similarly numbered banks in adjacent cache lines after a bank swizzle operation.
Figure 7:
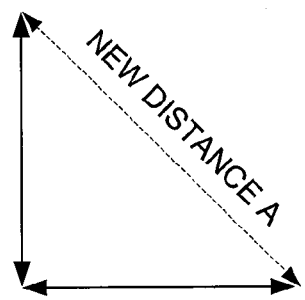

Reference is briefly made to FIGS. 6 and 7, which illustrates the distance between banks that have the same index number and that are located in adjacent cache lines. As shown in FIG. 6, (line 0, bank 0) and (line 1, bank 0) are separated by a Distance A, where the distance is measured by texels. Performing a bank swizzle operation on line 1 effectively increases the distance between these two banks to a New Distance A, as shown in FIG. 7. Thus, a system and method is disclosed for performing bank swizzle operations on texture data in order to reduce the probability of bank collisions, thereby resulting in less clock cycles needed to fetch data in a computer graphics environment.

Reference is now made to FIG. 1, which illustrates a simplified block diagram of a computer system 100. The computer system 100 includes a CPU 102, a system memory 104 and a graphics processing system 110. The CPU 102 performs various functions, including determining information, such as a viewpoint location, which allows for the generation of graphic displays. The system memory 104 stores a variety of data, including graphic display data such as texture data 106. The graphics processing system 110, based on information determined by the CPU 102 and data stored in the system memory 104, generates display data for a display device 130, such as, for example, a monitor. Texture mapping is used to apply textures to objects. Graphics processing system 110 renders slices of a 3D object. The slices are essentially "stacked" up to form an object. Once a 3D texture is created, the texture is applied to the object to form an image whereby the object becomes textured.

The CPU 102 provides requests to the graphics processing system 110 over a system interface 108, including requests to process and display graphics information. Graphics requests from the CPU 102 are received by the graphics processing system 110 and provided to a front end processor 112. The front end processor 112 generates a pixel stream containing pixel coordinates. Information relating to the pixel coordinates generated by the front end processor 112 is provided to a texture filter 118 through a texture cache system 114. The texture cache system 114 receives the information from the front end processor 112 and organizes the texture data storing the data in cache memory.

The texture filter 118 then filters the information performing, for example, bilinear filtering, trilinear filtering, or a combination thereof, and generates texture data for each pixel. In addition to conventional texture filter components, such as linear interpolators and accumulators, the texture filter 118 also includes a programmable table filter for providing special filtering operations in conjunction with the other texture filter components. The texture data 106 is a component of the final color data that is sent to a frame buffer 120, which is used to generate a display on a display device 130.

The texture cache system 114 may include multiple caches, including, for example, a level 1 (L1) cache and a L2 cache. The texture information is stored as individual texture elements known as texels, which are used during graphics processing to define color data displayed at pixel coordinates. The texture data 106 flows from the system memory 104 to the texture cache system 114, and then to the texture filter 118.

Figure 2:
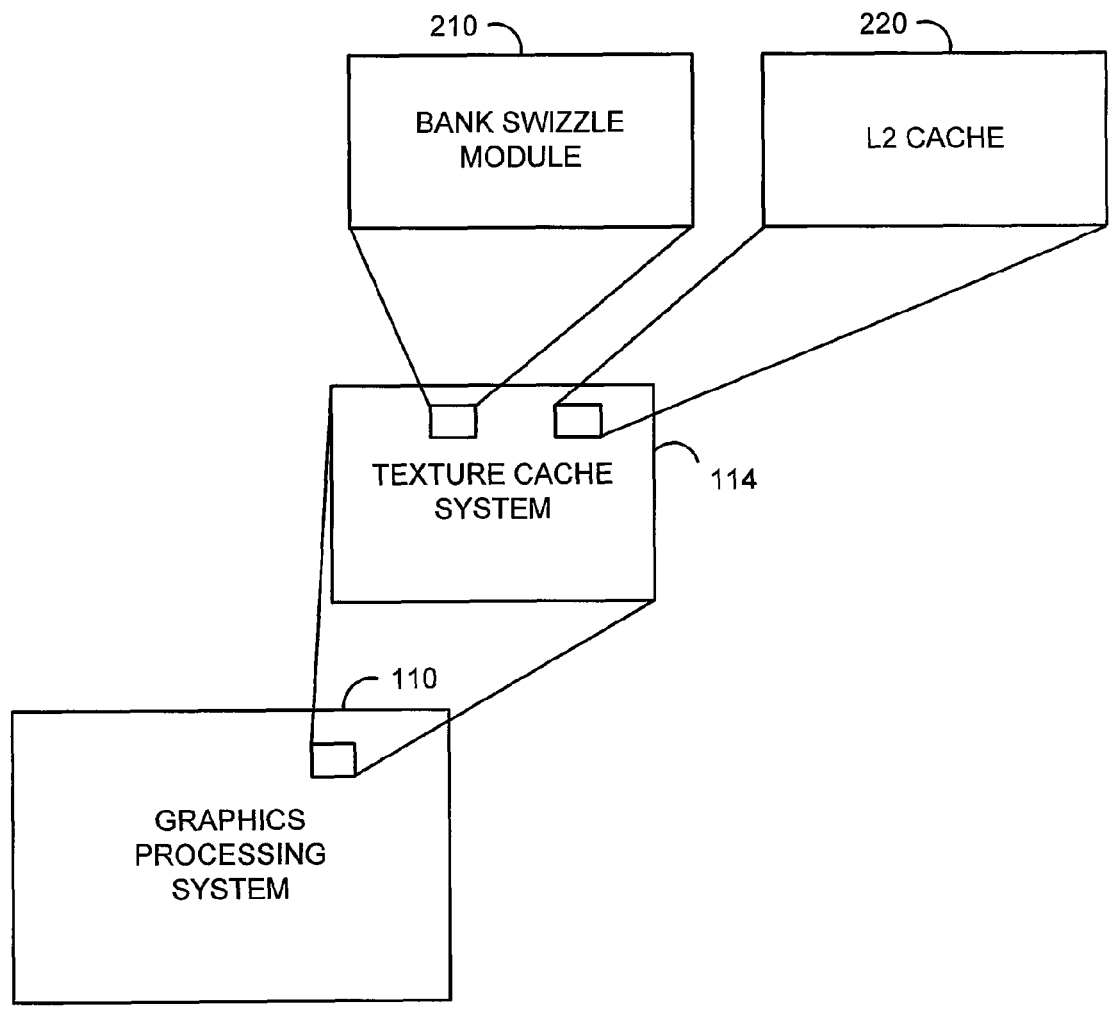
FIG. 2 illustrates certain basic components of the texture cache system within the graphics processing system.

Reference is now made to FIG. 2, which illustrates certain basic components of the texture cache system within the graphics processing system. It should be noted that some components not essential for understanding (by persons skilled in the art) of the texture data management unit are omitted for purposes of brevity. The graphics processing system 110 includes a texture cache system 114, which receives texture data 106. The data is processed before being forwarded to cache memory for storage. For some embodiments, the texture cache system 114 includes a bank swizzle module 210 and a L2 cache 220.

The bank swizzle module 210 takes the texture data 106 received from external memory and performs a bank swizzle operation on the data before forwarding the texture data 106 to the L2 cache 220 for storage. Generally, a bank swizzle operation refers to remapping of banks such that texture data stored in two different banks with the same index can be retrieved at the same time without waiting until the next cycle.

Figure 3:
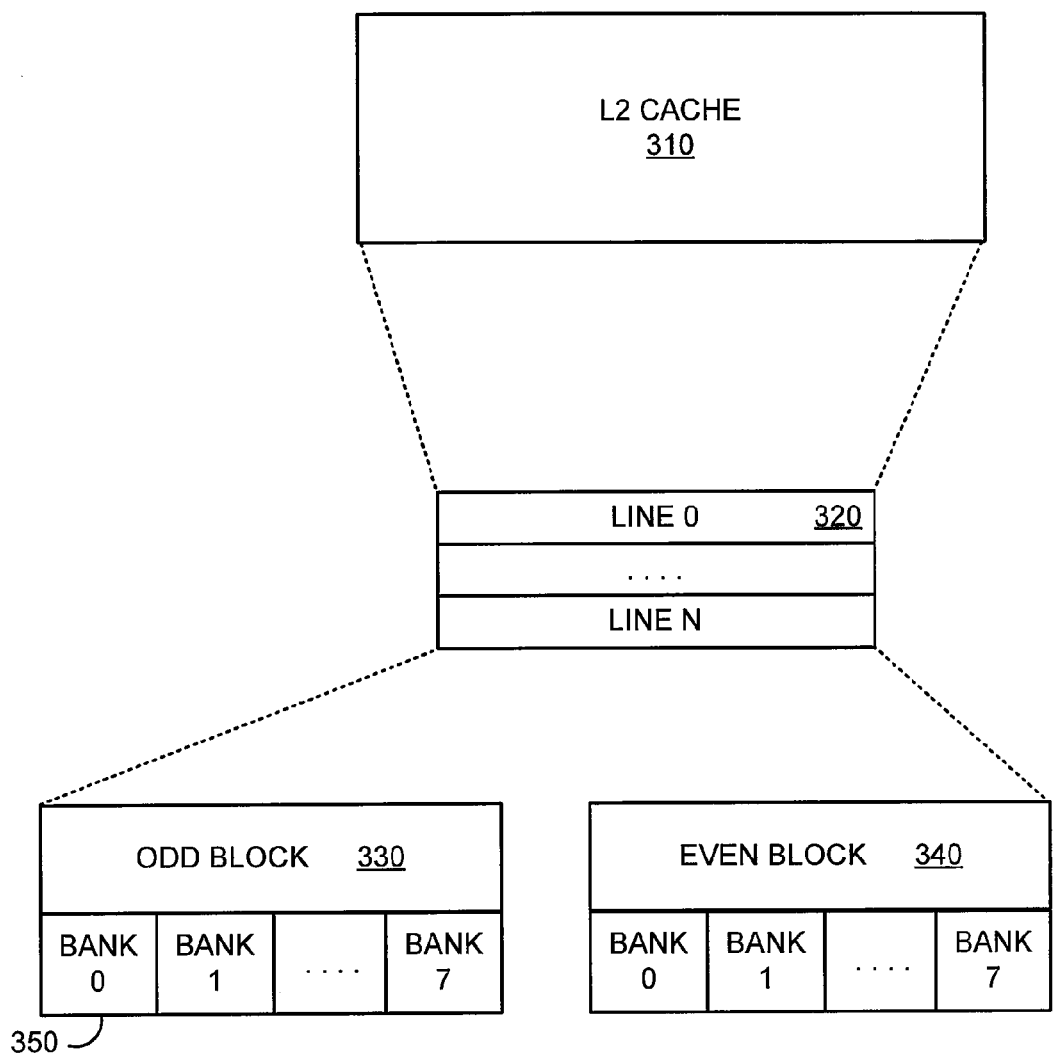
FIG. 3 is a block diagram illustrating an exemplary L2 cache organizational format.

The L2 cache 220 is coupled to the bank swizzle module 210 and stores the texture data 106 for future retrieval after the bank swizzle module 210 has processed the data received from external memory. Reference is made to FIG. 3, which is a block diagram illustrating an exemplary L2 cache organizational format. As discussed above, the texture cache system 114 may include multiple caches, including, for example, an L1 cache and an L2 cache. The L2 cache 310 may include multiple lines 320. Each cache line 320 may be further divided into an odd block 330 and an even block 340. The even block 340 serves to process texture data from even pipelines and the odd block 330 serves to process texture data from the odd pipelines. Within each of the blocks 330, 340, the L2 cache may be further subdivided into banks 350 of data. Although it is shown that each block includes eight banks (Bank 0 to Bank 7), one skilled in the art will appreciate that a cache may be partitioned into a different number of banks. Generally, banks are the means by which the texture data is fetched. One should note that the L2 cache 310 may be configured to contain multiple L2 cache lines 320 including, for example, 64, 128, 256, or 512. Furthermore, each L2 cache line 320 may be of varying widths including, for example, 128, 256, 512, 1024, or 2048 bits wide.

Figure 4:
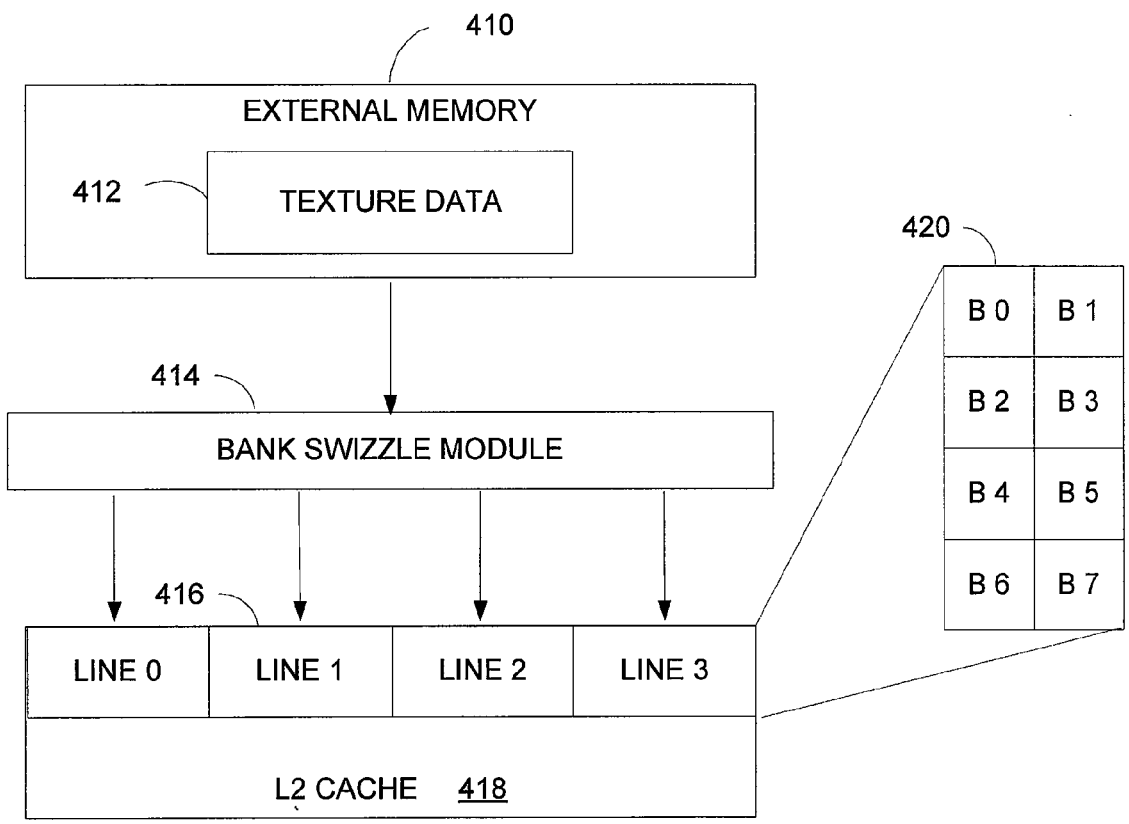
FIG. 4 depicts one embodiment for transferring texture data from external memory to a L2 cache through a bank swizzle module.

Reference is now made to FIG. 4, which depicts one embodiment for transferring texture data from external memory to a L2 cache through a bank swizzle module. Texture data 412 stored in external memory 410 is forwarded to the bank swizzle module 414 before it is eventually stored in the L2 cache 418 for future retrieval. The bank swizzle module 414 processes and reorganizes the texture data 412 received from the external memory 410 on a bank-by-bank basis and forwards the data to the L2 cache 418. As shown in FIG. 4, the L2 cache 418 may be subdivided into lines 416, which may be further subdivided into banks 420 of data. For some embodiments, the size of each cache line 416 is 1024 bits, or 1 Kb. Furthermore, each line 416 may be further subdivided into eight banks 420 that are each 128 bits in size. In preparation of storage into cache memory 418, the bank swizzle module 414 organizes the texture data 412 received from the external memory 410 into separate banks and cache lines. Upon execution of the bank swizzle operations, the texture data 412 is forwarded to the L2 cache 418 for storage.

Figure 5:
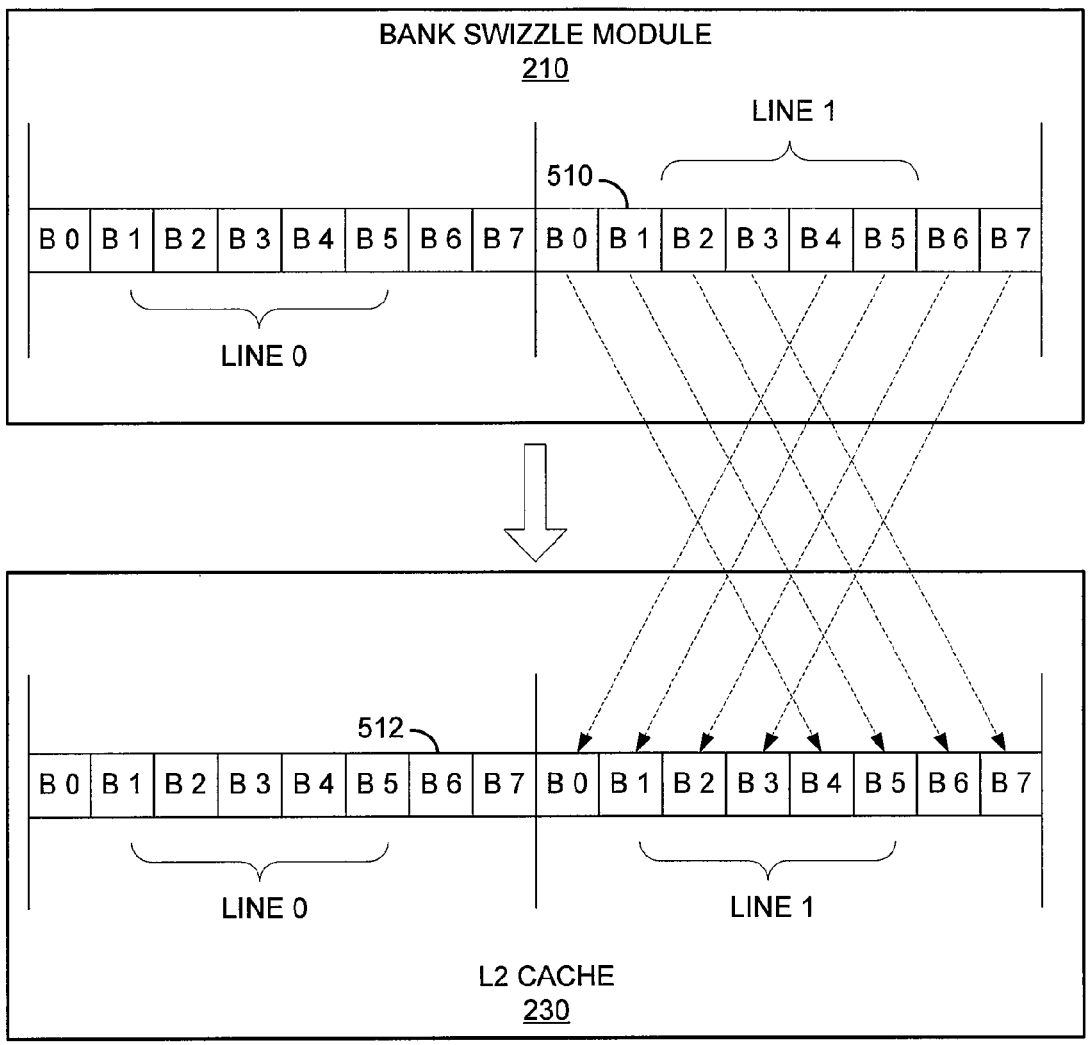
FIG. 5 illustrates an embodiment of a bank swizzle operation.

Reference is now made to FIG. 5, which illustrates an embodiment of a bank swizzle operation. Prior to the bank swizzle operation, texture data received from external memory is partitioned into cache lines (e.g., line 0, line 1). Each cache line is further partitioned into individual banks 510. For the embodiment shown, each line is comprised of eight banks 510 (bank 0 to bank 7). One should note that generally, texture data can be retrieved in a variety of ways, including on a bank-by-bank basis. For embodiments where texture data is retrieved on a bank-by-bank basis, any bank within any given cache line may be retrieved during a memory access. As a non-limiting example, a memory access may attempt to fetch the following banks: (line 0, bank 0), (line 0, bank 2), (line 1, bank 7), and (line 1, bank 0). For this example, a bank collision occurs because an attempt has been made to access two banks which have the same indices ((line 0, bank 0) and (line 1, bank 0)). As a result, only one of the two banks is retrieved during that cycle. Accordingly, an additional cycle is needed to retrieve the remaining bank. Generally, bank collisions are likely to occur because texture data tends to be localized in nature. Texture data will likely be stored in banks that are stored contiguously with respect to each other.

An embodiment of a bank swizzle operation is shown in FIG. 5, which increases the distance between similarly numbered banks in order to reduce the probability of bank collisions. For some embodiments, a bank swizzle operation may be performed within the L2 cache 230. One should note that, preferably, bank swizzle operations are performed within the L2 cache 230 and not in external memory because implementing swizzle operations in external memory may require changes to all modules that are related to memory access since the external memory is a shared resource. This would ultimately increase the overall complexity of the hardware.

Various mapping schemes or swizzle patterns may be followed in performing bank swizzle operations. For some embodiments, bank swizzle operations are performed on the fly such that texture data that was designated for specific memory locations (i.e., banks) within the L2 cache 230 are rerouted according to the mapping scheme used. For some embodiments, the following mapping scheme or bank swizzle pattern is utilized:

Bank 0 ↔ Bank 4

Bank 1 ↔ Bank 5

Bank 2 ↔ Bank 6

Bank 3 ↔ Bank 7

That is, the data that was to be stored in bank 0 within the L2 cache 230 is remapped and swapped with the data that was to be stored in bank 4 within the L2 cache 230. The data in bank 1 is swapped with the data in bank 5, and so on. The swizzle pattern above is illustrated in FIG. 5. One should note that for various embodiments, bank swizzle operations are performed on every other cache line in order to achieve the maximum distance between banks with the same index number.

Generally, bank swizzle operations are utilized to achieve the optimum distance in both the u and v directions. In particular, emphasis is placed on the fact that the distance in both directions (u, v) is of equal magnitude after bank swizzle operations are performed. Reference is made to FIG. 6, which illustrates a 4×8 footprint for texture data with a resolution of 32 BPE. The number of texels within each bank is 128 bits/32 BPE, or 4 texels per bank. As seen in FIG. 6, the distance between similarly numbered banks (e.g., bank 0) in adjacent cache lines (e.g., line 0 and line 1) is designated as a Distance A and is equal to 4 texels. Upon execution of the bank swizzle operation, the distance between banks is increased, thereby reducing the probability of a bank collision due to the localized nature of texture data. Reference is now made to FIG. 7, which illustrates the increase in distance between similarly numbered banks in adjacent cache lines after a bank swizzle operation. For purposes of illustration, only bank 0 and bank 4 have been remapped. Upon execution of the bank swizzle operation, the distance between banks is increased to a New Distance A. The value of New Distance A is now simply calculated by the expression:

$$\text{New Distance } A = \sqrt{(4^2 + 4^2)} = 5.657$$

Figure 8:
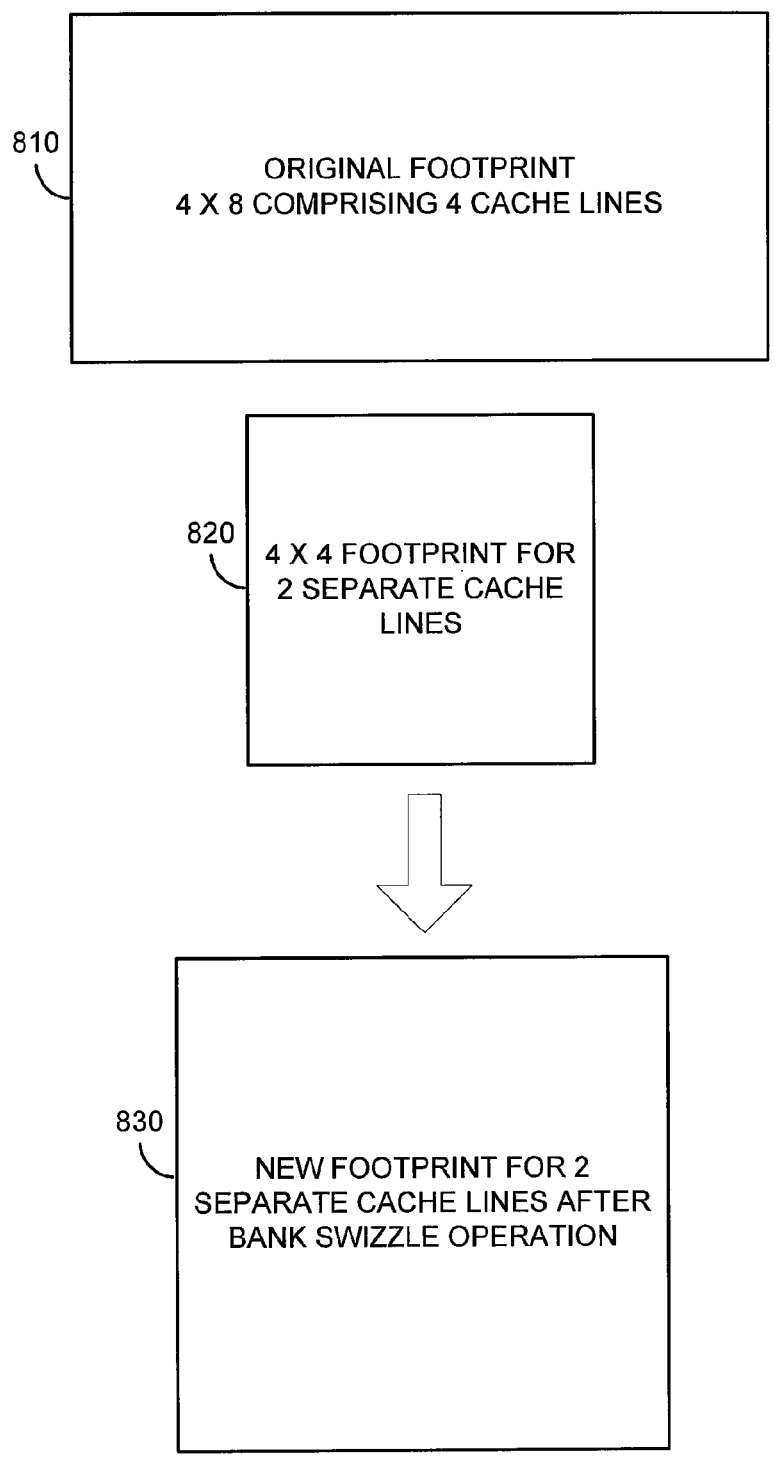
FIG. 8 illustrates the size of footprints before and after a bank swizzle operation.

Thus, the distance between banks with the same index that are located in adjacent cache lines are 5.657 texels apart. Reference is briefly made to FIG. 8, which illustrates the size of footprints before and after a bank swizzle operation. Footprint 810 reflects the 8×4 footprint for texture data with a 32 BPE resolution spanning four cache lines. To appreciate the increase in distance between two banks, two cache lines are examined. Footprint 820 shows two cache lines from footprint 810. The size of footprint 820 is thus 4×4 banks. The distance between similarly numbered banks is 4 texels (Distance A), yielding an area of 16 texels$^2$. Footprint 830 reflects the effective footprint achieved through bank swizzle operations. The area of footprint 830 is (New Distance A)$^2$, or $5.657^2$. Hence, the percentage increase in area due to bank swizzle operations is:

$$\frac{([\text{New Distance } A]^2 - 4^2)}{4^2} = 100\%$$

As seen above, the effective increase in area due to bank swizzle operations is a 100 percent over the original area.

Figure 9:
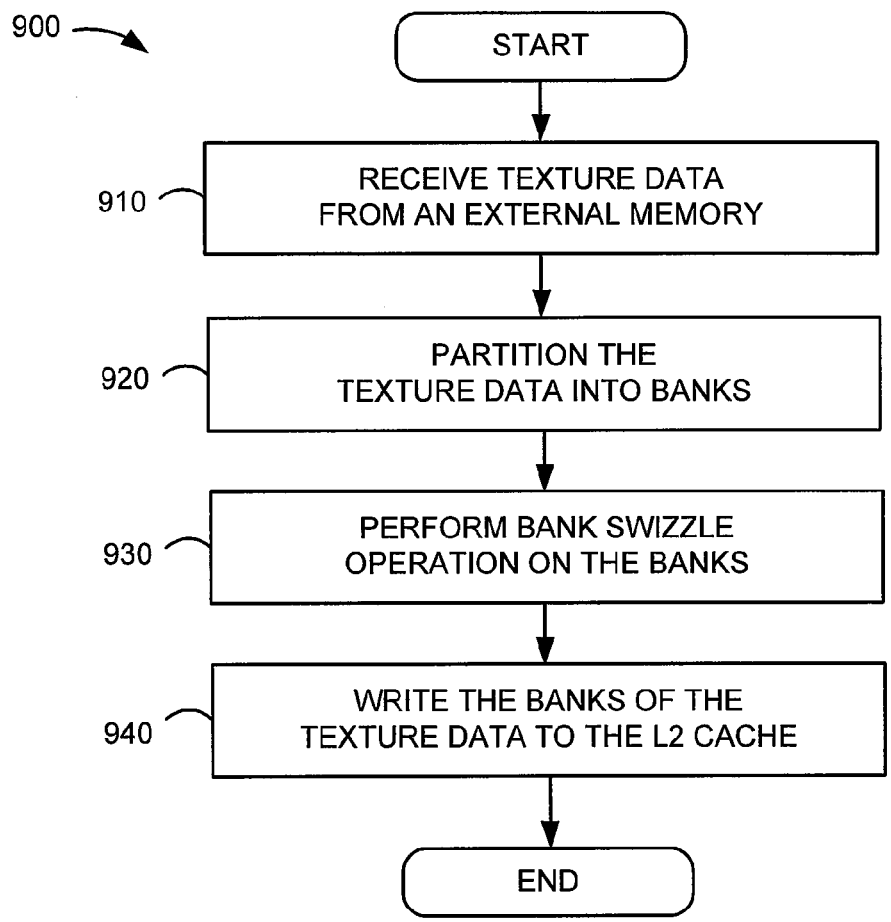
FIG. 9 depicts a top-level flow diagram for one embodiment of a method for performing bank swizzle operation to reduce the probability of bank collisions.

Reference is made to FIG. 9, which depicts a top-level flow diagram for one embodiment of a method for performing bank swizzle operation to reduce the probability of bank collisions. In the steps that follow, bank swizzle operations are performed in order to increase the distance between similarly numbered banks in adjacent cache lines in order to reduce the probability of bank collisions within the L2 cache of a graphics processing unit. Beginning with step 910, texture data is received from an external memory. Next in step 920, the texture data is partitioned into banks in preparation of storage into cache memory. The banks are then typically forwarded to the L2 cache for storage. However, in step 930, a bank swizzle operation is first performed on the banks. The bank swizzle is performed on a bank-by-bank basis before being forwarded to the L2 cache for storage. In step 940, the remapped texture data is written to the appropriate bank within the L2 cache. As a non-limiting example, reference is made back to FIG. 5. The texture data contained in (Bank 0, line 1) is remapped and now written to (line 1, bank 4) within the L2 cache. Likewise, texture data contained in (line 1, bank 1) is remapped and now written to (bank 5, line 1) within the L2 cache. It should be emphasized that the bank swizzle operation in step 930 is performed on alternating cache lines in order to maximize the distance between similarly numbered banks in adjacent cache lines.

Figure 10:
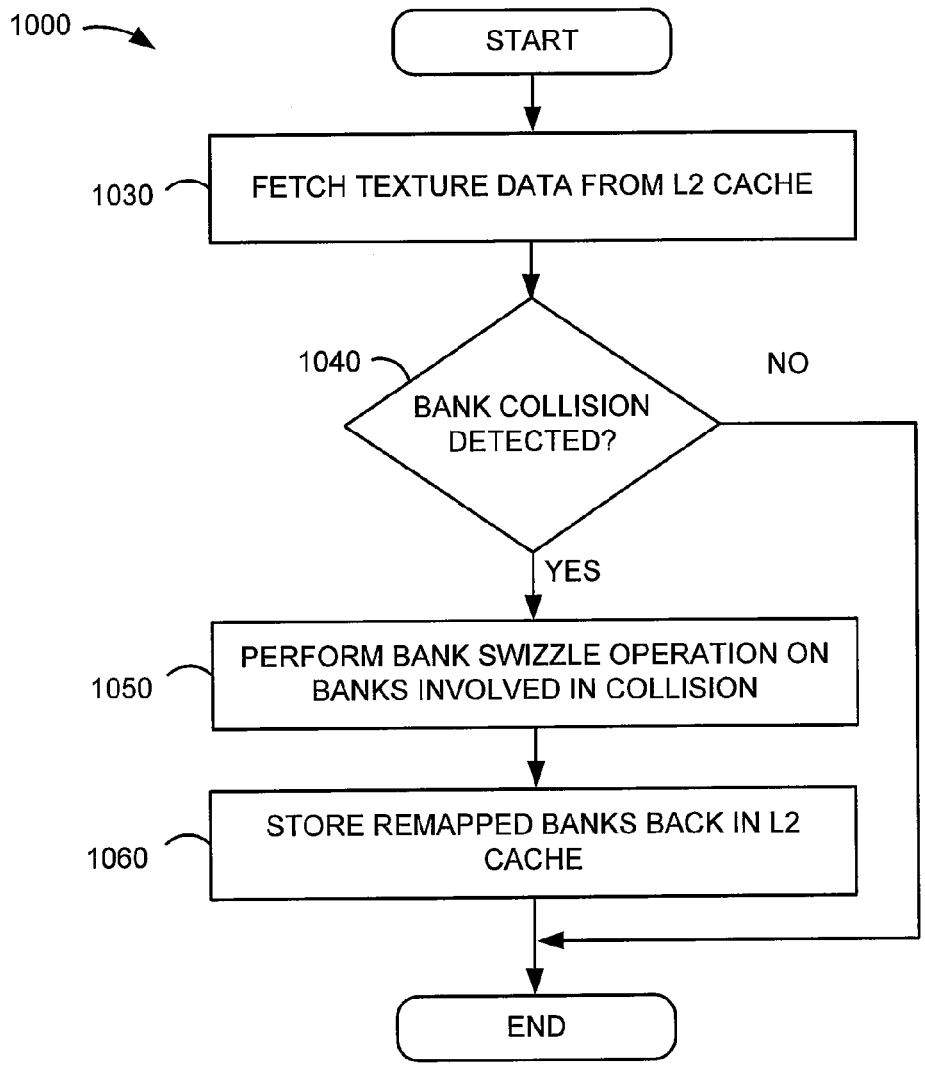
FIG. 10 depicts a top-level flow diagram for an alternative embodiment of a method for performing bank swizzle operation to reduce the probability of bank collisions.

Reference is now made to FIG. 10, which depicts a top-level flow diagram for an alternative embodiment of a method for performing bank swizzle operation to reduce the probability of bank collisions. For alternative embodiments, the bank swizzle operation may be conducted when a bank collision occurs during a fetch operation. Texture data is received from external memory and then partitioned into banks before being forwarded to a L2 cache. Later, when texture data is needed, the data is fetched from the L2 cache (step 1030). If a bank collision is detected (the YES condition in decision block 1040), then a bank swizzle operation is performed on the banks involved in the bank collision in such a way that at least one of the banks involved in the collision is remapped to another bank (step 1050).

As a non-limiting example, suppose the following banks of texture data are retrieved from the L2 cache during a given cycle: (line 0, bank 0), (line 0, bank 7), (line 1, bank 5), and (line 1, bank 0). A bank collision occurs because an attempt has been made to retrieve bank 0 from both lines 0 and 1 at the same time. Therefore, only one of the banks is retrieved during the current cycle, and an additional cycle is required to retrieve second bank involved in the collision. Because a bank collision has occurred (the YES condition in decision block 1040), a bank swizzle operation is performed on bank 0 in order to reduce the probability of another bank collision occurring. According to the bank swizzle pattern discussed earlier, bank 0 from one of the two cache lines (either line 0 or line 1) is remapped to bank 4. Thus, when the same texture data is needed, a bank collision is avoided because the following banks are now retrieved: (line 0, bank 0), (line 0, bank 7), (line 1, bank 5), and (line 1, bank 4). It should be noted that an additional cycle is no longer required to retrieve the banks of texture data since there is no bank collision.

In an alternative embodiment of a method for performing bank swizzle operations, analysis may be performed prior to bank swizzle operations whereby the banks of data to be fetched are first examined. Generally, a bank swizzle operation is performed if a bank collision is detected. However, in the event that a new bank collision will occur as a result of the bank swizzle operation, an alternative bank swizzle pattern to the one described earlier may be implemented.

As a non-limiting example, suppose the following banks of texture data are retrieved from the L2 cache during a given cycle: (line 0, bank 0), (line 0, bank 4) (line 1, bank 5) and (line 1, bank 0). Because a bank collision occurs (between line 0, bank 0 and line 1, bank 0), a bank swizzle operation is typically performed on one of the banks (e.g., bank 0) in order to reduce the probability of another bank collision occurring. If the bank swizzle pattern discussed earlier is utilized, bank 0 from one of the two cache lines (either line 0 or line 1) is remapped to bank 4. Thus, when the same texture data is needed, a bank collision is avoided because the following banks are now retrieved: (line 0, bank 0), (line 0, bank 4), (line 1, bank 5), and (line 1, bank 4). Note however, that a new bank collision is created as a result of utilizing the bank swizzle operation described earlier (between line 0, bank 4 and line 1, bank 4). Thus, in an alternative embodiment, "pre-swizzle" analysis may be performed to determine whether a new bank collision will be created as a result of a bank swizzle operation. If a new bank collision will occur, an alternative bank swizzle pattern is implemented such that ensuing bank collisions are avoided. As a non-limiting example, the following alternative bank swizzle pattern may be utilized instead:

Bank 0 ↔ Bank 7

Bank 1 ↔ Bank 6

Bank 2 ↔ Bank 5

Bank 3 ↔ Bank 4

Referring back to the example above, the banks would therefore be remapped to the following: (line 0, bank 0), (line 0, bank 4), (line 1, bank 5), and (line 1, bank 3). As a result, no ensuing bank collision occurs.

The embodiments of the present disclosure can be implemented in hardware, software, firmware, or a combination thereof. In some embodiments, the methods and systems are implemented in software or firmware that is stored in a memory and that is executed by a suitable instruction execution system. If implemented in hardware, as in an alternative embodiment, the methods and systems can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code, which include one or more executable instructions for implementing specific logical functions or steps in the process, and alternate implementations are included within the scope of an embodiment of the present disclosure in which functions may be executed out of order from that shown or discussed, including substantially concurrently or in reverse order, depending on the functionality involved, as would be understood by those reasonably skilled in the art of the present disclosure.

The methods and systems herein, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the present disclosure includes embodying the functionality of embodiments of the present disclosure in logic embodied in hardware or software-configured mediums.

Furthermore, it should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

For example, it will be appreciated by persons skilled in the art, based on the description provided herein that embodiments include a method for reducing bank collisions within a L2 cache comprising the following: receiving texture data from an external memory configured to store texture data used for texture filtering within the graphics processing unit, partitioning the texture data into banks, performing a bank swizzle operation on the banks, and writing the banks of the texture data to the L2 cache. For some embodiments, partitioning the texture data into banks comprises organizing the texture data into sequential banks with corresponding indices, wherein the banks are stored in at least one cache line and organizing the banks into cache lines. For other embodiments, the cache lines are each 1024 bits in size and the banks are 128 bits in size such that there are eight banks per cache line. In some embodiments, partitioning the texture data into banks and writing the banks of the texture data to the L2 cache are performed on a bank-by-bank basis. In some embodiments, performing the bank swizzle operation comprises remapping the banks located in alternating cache lines. In some embodiments, performing the bank swizzle operation further comprises placing banks with the same index located in adjacent cache lines at a angle with a magnitude of 45 degrees with respect to each other. In some embodiments, remapping comprises the following: swapping bank 0 with bank 4, swapping bank 1 with bank 5, swapping bank 2 with bank 6, and swapping bank 3 with bank 7. In some embodiments, remapping further comprises analyzing the banks to be remapped to determine whether new bank collisions will occur as a result of remapping the banks and utilizing a different bank swizzle pattern, wherein new bank collisions are avoided.

Another embodiment includes a computer system for processing graphics comprising an external memory configured to store texture data used for texture filtering within the graphics processing unit, a bank swizzle module configured to receive texture data from the external memory, partition the texture data into banks, and perform a bank swizzle operation to remap the banks of the texture data, and a L2 cache coupled to the bank swizzle module, wherein the L2 cache is configured to store the remapped texture data. For some embodiments, the texture data is divided into a plurality of banks, wherein the banks are stored in at least one cache line. In some embodiments, the one or more cache lines are each 1024 bits in size. In some embodiments, the banks are 128 bits in size such that there are eight banks per cache line. In some embodiments, the bank swizzle module is further configured to perform the bank swizzle operation on banks within alternating cache lines. In some embodiments, the bank swizzle module is configured to perform the bank swizzle operation only when a bank collision occurs during a fetching texture data from the L2 cache. In some embodiments, the bank swizzle module is configured to perform the bank swizzle operation after receiving the texture data from the external memory. In some embodiments, the bank swizzle module performs the bank swizzle operation based on the following mapping scheme: swapping bank 0 with bank 4, swapping bank 1 with bank 5, swapping bank 2 with bank 6, and swapping bank 3 with bank 7. In some embodiments, the bank swizzle module is configured to analyze the bank swizzle operations to be performed to determine whether new bank collisions will occur as a result of utilizing the mapping scheme, and wherein the bank swizzle module is further configured to utilize a different bank swizzle pattern, wherein new bank collisions are avoided.

Yet another embodiment includes a method for reducing bank collisions within a L2 cache comprising the following: fetching texture data from the L2 cache, wherein the texture data is used for texture filtering within a graphics processing unit, determining whether a bank collision has occurred while fetching the texture data, wherein the texture data is divided into banks located in at least one cache line within the L2 cache, and performing a bank swizzle operation on the banks if the bank collision has occurred. For some embodiments, the step of performing the bank swizzle operation comprises remapping the banks involved in the bank collision according to alternating cache lines. In some embodiments, remapping comprises the following: swapping bank 0 with bank 4, swapping bank 1 with bank 5, swapping bank 2 with bank 6, and swapping bank 3 with bank 7. In some embodiments, remapping further comprises analyzing the banks to be remapped to determine whether new bank collisions will occur as a result of remapping the banks and utilizing a different bank swizzle pattern, wherein new bank collisions are avoided. In some embodiments, the texture data is divided into a plurality of banks, wherein the banks are stored in at least one cache line, wherein the cache lines are each 1024 bits in size, and the banks are 128 bits in size such that there are eight banks per cache line. In some embodiments, partitioning the texture data into banks is performed on a bank-by-bank basis.

At least the following is claimed:

1. A method for reducing bank collisions within a level 2 (L2) cache comprising:
   receiving texture data from an external memory configured to store texture data used for texture filtering within a graphics processing unit;
   partitioning the texture data into banks;
   performing a bank swizzle operation on the banks, wherein performing the bank swizzle operation comprises remapping the banks located in alternating cache lines, wherein remapping further comprises:
   analyzing the banks to be remapped to determine whether new bank collisions will occur as a result of remapping the banks; and
   utilizing a different bank swizzle pattern, wherein new bank collisions are avoided; and
   writing the banks of the texture data to the L2 cache.

2. The method of claim 1, wherein partitioning the texture data into banks comprises:
   organizing the texture data into sequential banks with corresponding indices, wherein the banks are stored in at least one cache line; and
   organizing the banks into cache lines.

3. The method of claim 2, wherein the cache lines are each 1024 bits in size and wherein the banks are 128 bits in size such that there are eight banks per cache line.

4. The method of claim 1, wherein partitioning the texture data into banks and writing the banks of the texture data to the L2 cache are performed on a bank-by-bank basis.

5. The method of claim 1, wherein performing the bank swizzle operation further comprises placing banks with the same index located in adjacent cache lines at an angle with a magnitude of 45 degrees with respect to each other.

6. The method of claim 1, wherein remapping comprises:
   swapping bank 0 with bank 4;
   swapping bank 1 with bank 5;
   swapping bank 2 with bank 6; and
   swapping bank 3 with bank 7.

7. A computer system for processing graphics comprising:
   an external memory configured to store texture data used for texture filtering within the graphics processing unit;
   a bank swizzle module configured to receive texture data from the external memory, partition the texture data into banks, and perform a bank swizzle operation to remap the banks of the texture data, wherein the bank swizzle module is configured to analyze the bank swizzle operations to be performed to determine whether new bank collisions will occur as a result of remapping the banks, and wherein the bank swizzle module is further configured to utilize a different bank swizzle pattern, wherein new bank collisions are avoided; and
   a level 2 (L2) cache coupled to the bank swizzle module, wherein the L2 cache is configured to store the remapped texture data.

8. The computer system of claim 7, wherein the texture data is divided into a plurality of banks, wherein the banks are stored in at least one cache line.

9. The computer system of claim 8, wherein the one or more cache lines are each 1024 bits in size.

10. The computer system of claim 8, wherein the banks are 128 bits in size such that there are eight banks per cache line.

11. The computer system of claim 7, wherein the bank swizzle module is further configured to perform the bank swizzle operation on banks within alternating cache lines.

12. The computer system of claim 7, wherein the bank swizzle module is configured to perform the bank swizzle operation only when a bank collision occurs while fetching texture data from the L2 cache.

13. The computer system of claim 7, wherein the bank swizzle module is configured to perform the bank swizzle operation after receiving the texture data from the external memory.

14. The computer system of claim 7, wherein the bank swizzle module performs the bank swizzle operation based on a mapping scheme comprising:
   swapping bank 0 with bank 4;
   swapping bank 1 with bank 5;
   swapping bank 2 with bank 6; and
   swapping bank 3 with bank 7.

15. A method for reducing bank collisions within a level 2 (L2) cache comprising:
   fetching texture data from the L2 cache, wherein the texture data is used for texture filtering within a graphics processing unit;
   determining whether a bank collision has occurred while fetching the texture data, wherein the texture data is divided into banks located in at least one cache line within the L2 cache; and
   performing a bank swizzle operation on the banks if the bank collision has occurred, wherein performing the bank swizzle operation comprises remapping the banks involved in the bank collision according to alternating cache lines, and wherein remapping further comprises:
   analyzing the banks to be remapped to determine whether new bank collisions will occur as a result of remapping the banks; and
   utilizing a different bank swizzle pattern, wherein new bank collisions are avoided.

16. The method of claim 15, wherein remapping comprises:
   swapping bank 0 with bank 4;
   swapping bank 1 with bank 5;
   swapping bank 2 with bank 6; and
   swapping bank 3 with bank 7.

17. The method of claim 15, wherein the texture data is divided into a plurality of banks, wherein the banks are stored in at least one cache line, wherein:
   the cache lines are each 1024 bits in size; and
   the banks are 128 bits in size such that there are eight banks per cache line.

18. The method of claim 15, wherein partitioning the texture data into banks is performed on a bank-by-bank basis.

* * * * *